(12) United States Patent
Yamaguchi

(10) Patent No.: US 12,365,327 B2
(45) Date of Patent: Jul. 22, 2025

(54) CHARGE CONTROL DEVICE FOR HYBRID ELECTRIC VEHICLE

(71) Applicant: TOYOTA JIDOSHA KABUSHIKI KAISHA, Toyota (JP)

(72) Inventor: Mitsuru Yamaguchi, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 18/467,067

(22) Filed: Sep. 14, 2023

(65) Prior Publication Data

US 2024/0174214 A1 May 30, 2024

(30) Foreign Application Priority Data

Nov. 29, 2022 (JP) ................... 2022-190802

(51) Int. Cl.
*B60W 10/08* (2006.01)
*B60W 10/06* (2006.01)
*B60W 20/13* (2016.01)
*B60W 50/02* (2012.01)
*F02D 41/02* (2006.01)
*F02D 41/22* (2006.01)
*H02J 7/14* (2006.01)

(52) U.S. Cl.
CPC ............ *B60W 20/13* (2016.01); *B60W 10/06* (2013.01); *B60W 10/08* (2013.01); *B60W 50/0205* (2013.01); *F02D 41/021* (2013.01); *F02D 41/22* (2013.01); *H02J 7/1492* (2013.01); *B60W 2510/244* (2013.01); *B60W 2710/0644* (2013.01); *B60W 2710/081* (2013.01)

(58) Field of Classification Search
None
See application file for complete search history.

(56) References Cited

U.S. PATENT DOCUMENTS

| 6,621,244 | B1 | 9/2003 | Kiyomiya et al. | |
| 2009/0259391 | A1* | 10/2009 | Ando | B60K 6/365 180/65.265 |
| 2010/0108032 | A1* | 5/2010 | Pursifull | B60W 10/06 123/406.12 |
| 2013/0226389 | A1* | 8/2013 | Yamazaki | B60W 10/26 701/22 |
| 2021/0370909 | A1* | 12/2021 | Kim | B60W 10/06 |

FOREIGN PATENT DOCUMENTS

| JP | 2001-050077 A | 2/2001 |
| JP | 2001-157306 A | 6/2001 |
| JP | 2009-029319 A | 2/2009 |

* cited by examiner

*Primary Examiner* — James M McPherson
(74) *Attorney, Agent, or Firm* — SoraIP, Inc.

(57) ABSTRACT

When the remaining charge level of the battery decreases to a predetermined first determination value or less, the engine rotational speed increase control unit increases the target lower limit rotational speed of the engine or of the motor to the target lower limit rotational speed so that the operating point of the engine falls within a predetermined engine torque stable region. Then, in a state where the operating point of the engine is within the engine torque stable region, the charge control unit controls the negative torque of the electric motor so that the actual charge level by the electric motor becomes a preset target charge level. The battery can thus be recovered from an insufficient charge level.

4 Claims, 4 Drawing Sheets

CHARGE CONTROL DEVICE FOR HYBRID ELECTRIC VEHICLE

CROSS-REFERENCE TO RELATED APPLICATION

This application claims priority to Japanese Patent Application No. 2022-190802 filed on Nov. 29, 2022, incorporated herein by reference in its entirety.

BACKGROUND

1. Technical Field

The present disclosure relates to charge control devices for hybrid electric vehicles including an electric motor provided between an engine and drive wheels and a battery that is charged with electric power generated by the electric motor.

2. Description of Related Art

There is known a control device for a hybrid electric vehicle including an electric motor (motor generator) disposed between an engine and drive wheels and a battery that is charged with power generated by the electric motor. An example of such a control device is a charge control device for a hybrid electric vehicle described in Japanese Unexamined Patent Application Publication No. 2009-029319 (JP 2009-029319 A). In JP 2009-029319 A, when generating electric power by rotationally driving the electric motor by idle rotation of the engine, the idle rotation of the engine and consumption (negative) torque of the electric motor are changed according to the available capacity of the battery. When the charge level of the battery is low, the idle speed of the engine is increased and the consumption torque of the electric motor is reduced to reduce the load on high current systems such as the electric motor and an inverter.

SUMMARY

When charging a battery, the output of an electric motor (motor generator) is maintained by balancing positive torque of engine torque and negative torque of the electric motor. However, when the engine is in a low rotation range such as during idle rotation like when the vehicle is at a stop or creeping, the actual engine torque may become lower than the required torque, that is, engine torque deviation may occur, due to the high intake air temperature of the engine, knocking of the engine, a misfire of the engine, etc., which may reduce the rotational speed of the electric motor. In such a case, the rotational speed of the electric motor can be increased by reducing the negative torque of the electric motor. However, this may result in the battery not having an enough charge level. When the engine torque is significantly reduced due to the engine torque deviation, the negative torque of the electric motor is stuck at a negative torque upper limit value (limit value of the electric motor) for rotation adjustment, and the rotational speed decreases. Sufficient torque cannot be obtained from the engine rotating at low speed, which further reduces the charge level of the battery. The control device for a hybrid electric vehicle described in JP 2009-029319 A does not at all consider this problem that occurs when the actual engine torque is less than the required engine torque.

The present disclosure was made in view of the above circumstances, and it is an object of the present disclosure to provide a charge control device for a hybrid electric vehicle that can recover a battery from an insufficient charge level even when the actual engine torque of an engine is less than the required engine torque.

As a result of various studies based on the above circumstances, the inventors found the following fact. In the case where the actual engine torque is less than the required engine torque when charging a battery with a reduced remaining charge level, charging of the battery can be suitably performed by first increasing the rotational speed of the engine so as to achieve engine torque control accuracy and then controlling the engine torque so that the charge level of the battery becomes a target charge level. The present disclosure was made based on such findings.

That is, the gist of the present disclosure is as follows.
(a) A control device for a hybrid electric vehicle, the hybrid electric vehicle including an engine, an electric motor connected to a power transmission path between the engine and a drive wheel so as to be able to transmit power, and a battery configured to be charged with electric power generated by the electric motor driven by the engine, the control device including:
(b) an engine rotational speed increase control unit configured to, when a remaining charge level of the battery has decreased to a predetermined value or less, increase a rotational speed of the engine in such a manner that an operating point of the engine falls within a preset engine torque stable region; and
(c) a charge control unit configured to, with the operating point of the engine being controlled to be within the engine torque stable region by the engine rotational speed increase control unit, control torque of the electric motor in such a manner that an actual charge level with the electric motor becomes a preset target charge level.

According to the present disclosure, when the remaining charge level of the battery has decreased to the predetermined value or less, the engine rotational speed increase control unit increases a target lower limit rotational speed of the engine so that the operating point of the engine falls within the preset engine torque stable region. Thereafter, with the operating point of the engine being controlled to be within the engine torque stable region, the charge control unit controls the torque of the electric motor in such a manner that the actual charge level with the electric motor becomes the preset target charge level. The battery can thus be recovered from an insufficient charge level.

Suitably, in the first disclosure, the engine torque stable region is a region of a two-dimensional coordinate plane for the rotational speed of the engine and torque of the engine excluding a region where the torque of the engine is unstable because sufficient torque accuracy of the engine is not achieved due to a high intake air temperature of the engine, knocking of the engine, a misfire of the engine, resonance of a power transmission member, or the like. As described above, the torque of the electric motor is controlled so that the actual charge level with the electric motor becomes the preset target charge level in the region excluding the region where the torque of the engine is unstable, namely in the region where the torque control accuracy of the engine is more likely to be achieved. Therefore, the battery can be easily recovered from an insufficient charge level.

Suitably, in the first disclosure, the charge control unit is configured to, when the hybrid electric vehicle is at a stop, perform rotational speed feedback control on the electric motor in such a manner that an actual rotational speed of the engine becomes a target value that is based on a preset target lower limit rotational speed. Since the rotational speed of the electric motor is thus stably maintained, the battery can be easily recovered from an insufficient charge level.

Suitably, the target lower limit rotational speed is either a value on a boundary of the region where the torque of the engine is unstable because the sufficient torque accuracy of the engine is not achieved in the two-dimensional coordinate plane for the rotational speed of the engine and the torque of the engine or a value along the boundary. Accordingly, the rotational speed of the electric motor is controlled so that the actual charge level of the battery becomes the preset target charge level in the region excluding the region where the torque of the engine is unstable, namely in the region where the torque control accuracy of the engine is more likely to be achieved. Therefore, the battery can be easily recovered from an insufficient charge level.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, examples of the present disclosure will be described in detail with reference to the drawings.

Figure 1:
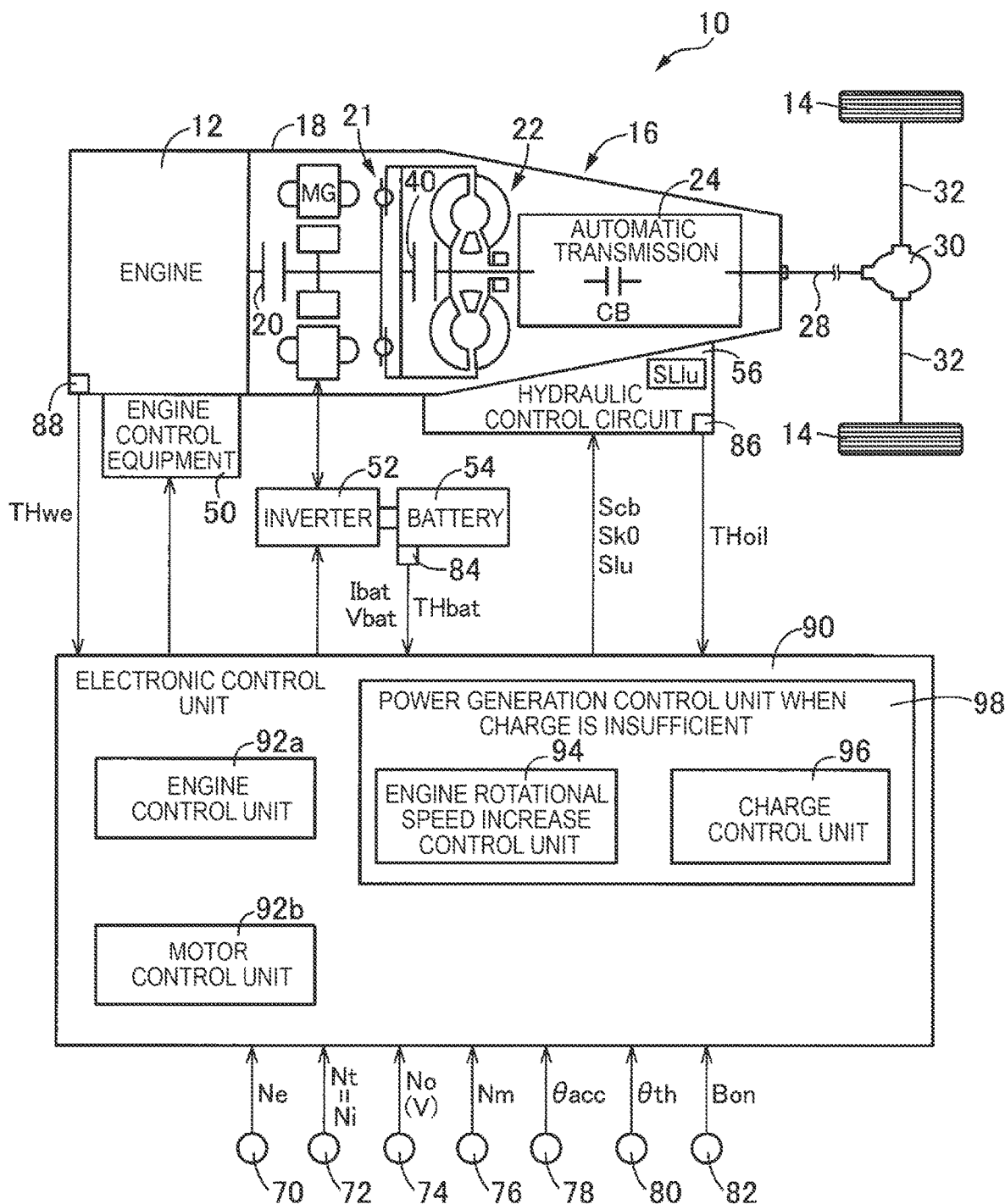
FIG. 1 is a diagram for explaining a hybrid electric vehicle and an electronic control device to which the present disclosure is applied, and a diagram for explaining a main part of a control function of a control device.

FIG. 1 is a diagram for describing a schematic configuration of a hybrid electric vehicle 10 to which the present disclosure is applied, and is a diagram for describing main parts of a control function and a control system for various kinds of control in a hybrid electric vehicle (hereinafter referred to as vehicles) 10. In FIG. 1, a vehicle 10 includes an engine 12 that functions as a power source and an electric motor MG. Vehicle 10 also includes an electric motor MG in a power transmission path 16 between engine 12 and drive wheels 14.

In the engine 12, the engine control device 50 is controlled by an electronic control device 90, which will be described later, to control the rotational speed Ne (rpm) and the engine torque Te (Nm) of the engine 12.

The electric motor MG is a rotating electric machine having a function as a motor and a function as a generator that generates electric power, and is a so-called motor generator. The electric motor MG is connected to the battery 54 via the inverters 52. The battery 54 is a power storage device that transmits and receives electric power to and from the electric motor MG. In the electric motor MG, the inverter 52 is controlled by the electronic control device 90, so that the output torque Tm which is the positive torque of the electric motor MG and the power generation (regeneration) torque-Tm which is the negative torque are controlled.

The power transmission path 16 includes, in the case 18, a K0 clutch 20 provided between the engine 12 and the electric motor MG, a pulsation absorbing damper 21 that absorbs pulsation of torque while transmitting power, a torque converter 22 with a LU clutch 40, and an automatic transmission 24.

The power transmission path 16 includes, outside the case 18, a propeller shaft 28 connected to a transmission output shaft 26 which is an output rotation member of the automatic transmission 24, a differential gear 30 connected to the propeller shaft 28, a pair of drive shafts 32 connected to the differential gear 30, and the like.

The automatic transmission 24 is a known planetary gear type automatic transmission including, for example, one or more sets of planetary gears (not shown) and an engagement device CB. The engagement device CB includes, for example, a plurality of known hydraulic frictional engagement devices. The automatic transmission 24 is a stepped transmission in which any one of a plurality of gear stages (also referred to as gear stages) having different gear ratio (also referred to as gear ratio) γat (=AT input-speed Ni/AT output-speed No) is formed by engagement of any one of the engagement devices in the engagement device CB. In the automatic transmission 24, a gear stage formed in accordance with an accelerator operation of a driver (=driver), a vehicle speed V, and the like is switched by an electronic control device 90 described later. MG rotational speed Nmg is equal to the rotational speed Ne of the engine 12 in the engaged state of K0 clutch 20, and is equal to the input rotational speed and AT input rotational speed Ni of the torque converter 22 in the engaged state of LU clutch 40.

The vehicle 10 includes an electronic control device 90. The electronic control device 90 includes, for example, a so-called microcomputer including a CPU, RAM, ROM, an input/output interface, and the like. CPU performs various kinds of control of the vehicles 10 by performing signal-processing in accordance with a program stored in ROM in advance while using a temporary storage function of RAM. The electronic control device 90 includes computers for engine control, motor control, clutch control, transmission control, and the like as necessary.

The electronic control device 90 is supplied with various types of signals and the like based on detected values by various sensors (for example, the engine rotation speed sensor 70, the turbine rotation speed sensor 72, the output rotation speed sensor 74, MG rotation speed sensor 76, the accelerator opening degree sensor 78, the throttle valve opening degree sensor 80, the brake switch 82, the battery sensor 84, the oil temperature sensor 86, the water temperature sensor 88, and the like) provided in the vehicle 10. For example, a turbine rotational speed Nt which is the same value as the engine rotational speed Ne, AT input rotational speed Ni which is the rotational speed of the engine 12, a AT output rotational speed No corresponding to the vehicle speed V, a MG rotational speed Nm which is the rotational speed of the electric motor MG, an accelerator opening degree θacc which is the accelerator operation amount of the driver indicating the magnitude of the acceleration operation of the driver, a throttle valve opening degree θth which is the opening degree of the electronic throttle valve, a brake on signal Bon which is a signal indicating a state in which the brake pedal for operating the wheel brake is operated by the driver, a battery temperature THbat of the battery 54, a battery charge/discharge current Ibat, a battery voltage Vbat, a hydraulic oil temperature THoil which is the temperature of the hydraulic oil in the hydraulic control circuit 56, a coolant temperature THwe of the engine 12, and the like are supplied.

Various command signals are output from the electronic control device 90 to each device (for example, the engine control device 50, the inverter 52, the hydraulic control circuit 56, and the like) provided in the vehicle 10. For example, an engine control command signal Se for controlling the engine 12, a MG control command signal Sm for controlling the electric motor MG, a CB hydraulic control command signal Scb for controlling the engagement device CB, a K0 hydraulic control command signal Sko for controlling the K0 clutch 20, and a LU hydraulic control command signal Slu for controlling the LU clutch 40 are outputted.

The electronic control device 90 includes an undercharge power generation control unit 98, which includes an engine control unit 92a, an electric motor control unit 92b, an engine rotational speed increase control unit 94, and a charge control unit 96, in order to realize various controls in the vehicle 10.

The electronic control device 90 functions as a hybrid control unit that executes hybrid drive control by the engine 12 and the electric motor MG and the like by the function of the engine control unit 92a and the function of the electric motor control unit 92b that controls the operation of the electric motor MG via the inverter 52. In the hybrid drive control, the drive of the vehicle 10 is mainly controlled so as to obtain sufficient acceleration performance with the fuel consumption as low as possible.

The electronic control device 90 calculates the drive request amount for the vehicle 10 by the driver by applying the accelerator operation amount θacc and the vehicle speed V to the drive request amount map, for example. The drive requirement is, for example, the required drive torque Trdem [Nm] in the drive wheels 14. The required driving torque Trdem [Nm] is the required driving power Prdem [W] at the vehicle speed V at that time. In order to realize the required driving power Prdem, the engine control unit 92a outputs an engine control command signal Se for controlling the engine 12, and the electric motor control unit 92b outputs a MG control command signal Sm for controlling the electric motor MG. When the accelerator operation amount θacc is zero, the engine control unit 92a performs idle rotation control for autonomously rotating the engine 12 so as to achieve the target idle rotational speed. The target idle rotational speed is increased from the lower limit value by warm-up of the engine 12 or the like, with the target lower limit rotational speed being the basic value, that is, the lower limit value.

When the required driving torque Trdem can be provided only by outputting the electric motor MG, the electronic control device 90 establishes the motor driving mode, that is, BEV driving mode, as the driving mode for driving the vehicles 10. On the other hand, when the required drive torque Trdem cannot be satisfied without using at least the power of the engine 12, the electronic control device 90 establishes the engine drive mode, that is, HEV drive mode, as the drive mode. HEV driving mode is a hybrid driving mode in which, in the engaged condition of K0 clutch 20, at least the engine 12 is used as a power source SP and the engine travels, that is, the hybrid travels (HEV travels). On the other hand, the electronic control device 90 establishes HEV drive mode as the drive mode even when the required drive torque Trdem can be provided only by outputting the electric motor MG, when the battery 54 needs to be charged, when the engine 12 needs to be warmed up, or when the hydraulic oil temperature THoil is at a very low temperature.

Figure 2:
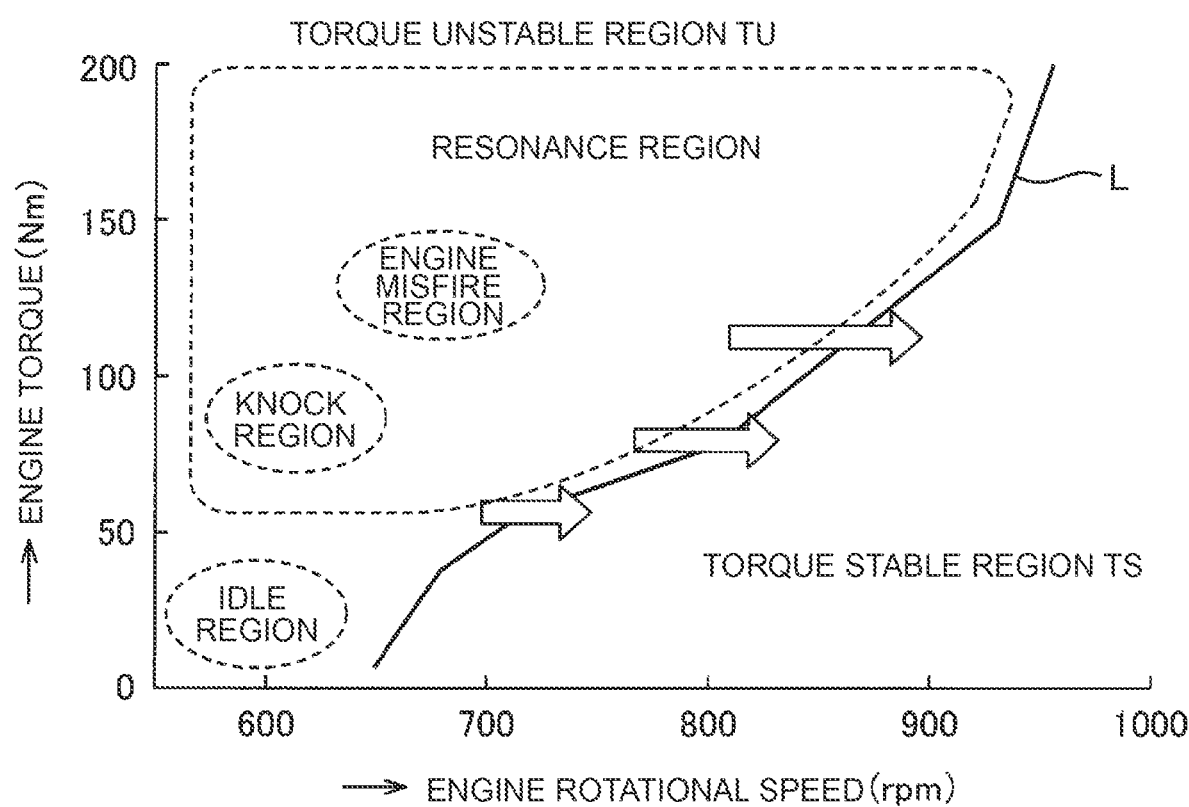
FIG. 2 is a diagram illustrating a boundary between a region where the torque accuracy of the engine is not stable and a region where the torque accuracy of the engine is stable in a two-dimensional coordinate plane for the rotational speed of the engine and the torque of the engine.

When the battery 54 needs to be charged, K0 clutch 20 is engaged, the electric motor MG is rotationally driven by the engine 12, and the output current (negative torque) of the electric motor MG is controlled so as to obtain a target charge level based on the generated electric power of the electric motor MG, so that the battery 54 is charged. That is, in such a state-of-charge, the positive torque of the engine 12 and the negative torque of the electric motor MG are balanced, so that the electric motor MG is maintained rotating and the battery 54 is charged. However, in a relatively low-speed range, such as when the vehicle 10 stops or runs at a low-speed coast, for example, where the accelerator operation amount θacc is zero and the engine 12 is idle, for example, in a relatively low-speed range below 950 rpm, there is a region, such as shown in FIG. 2, in which the high intake air temperature of the engine 12, knocking of the engine 12, a misfire of the engine 12, and vibration of the pulsation absorbing damper 21 cause the engine 12 to become unstable, resulting in a shortage of the actual Torque of the engine 12 with respect to the requested engine Torque, which reduces rotation of the electric motor MG. In such cases, the motor can be rotated up by decreasing the negative torque of the electric motor MG, but the charge level of the battery 54 becomes insufficient. On the other hand, when an attempt is made to increase the negative torque of the electric motor MG in order to secure the charge level of the battery 54, the rotation of the engine 12 connected to the electric motor MG decreases, and a sufficient torque cannot be obtained from the low-rotation engine 12, and the charge level of the battery 54 becomes insufficient.

For example, in the low-rotation region of the engine 12 below 950 rpm as shown in FIG. 2, in the two-dimensional coordinate plane of the horizontal axis indicating the engine rotational speed Ne and the vertical axis indicating the engine torque Te, a region in which the engine torque Te is decreased due to the idle rotation of the engine 12 in which the optimum ignition timing MBT torque becomes flat and the matching value is easily displaced when the rotation is low and the combustion of the engine 12 is weak, a region in which the engine torque Te is decreased due to the decrease in the accuracy of the optimum ignition timing MBT due to the knocking of the engine 12, a region in which the engine torque Te is decreased due to the misfire of the engine 12, and a region in which the engine torque Te is decreased due to the rotational variation due to the resonance of the pulsation absorbing damper 21 are respectively shown. These regions are regions in which the torque accuracy of the engine 12 is not obtained with respect to the required engine torque (required output), and the actual torque of the engine 12 is likely to be insufficient. The line L in FIG. 2 is a characteristic line in which the rotational speed of the engine 12 rises from the vicinity of 650 rpm and the engine torque Te increases as the rotational speed Ne of the engine 12 increases, and shows a boundary between the engine torque unstable region TU in which the torque of the engine 12 is unstable and the torque accuracy is low and the engine torque stable region TS in which the torque of the engine 12 is stable and the torque accuracy is high. In the present embodiment, the line L indicates the target lower limit rotational speed NeTs-a of the engine 12 after the engine 12 has been changed after the operating point of the engine is moved to the engine torque stable region TS, α is a value from 0 to several tens of rpm, and is a margin value.

That is, the target lower limit rotational speed NeTs of the engine 12 is a value on the line L or a value along the line L.

On the other hand, in the present embodiment, as shown by the arrow in FIG. 2, the engine 12 is increased in the rotational speed Ne and the engine 12 is set within an engine torque stable region TS in which the operating point of the engine 12 is stable when the remaining charge level SOC of remaining charge of the battery 54 decreases due to insufficient torque of the engine 12 in a low rotational speed region in which the rotational speed Ne of the engine 12 is, for example, a 950 rpm or less, and an undercharge power generation control unit 98 that maintains the target charge level of the battery 54 is provided.

When the remaining charge level SOC of the battery 54 is reduced to a predetermined value, for example, a first determination value SOC1 or less for determining that SOC is lower as the normal use range is considered to be a lower torque defect, the engine rotational speed increase control unit 94 of the undercharge power generation control unit 98 temporarily increases the target lower limit rotational speed of the target lower limit rotational speed of the electric motor MG driven by the engine 12 or the engine 12 by a predetermined value from the target lower limit rotational speed Ntl used so that the operating point of the engine 12 becomes a preset position within the engine torque stable region TS from the engine torque unstable region TU of FIG. 2, and sets the target lower limit rotational speed Ntl1. The predetermined value is a value at which the operating point of the engine 12 sufficiently exceeds the line L. Further, the target lower limit rotational speed is a minimum value of a target value of the rotational speed control of the engine 12 that varies depending on the warm-up purpose or the like or the electric motor MG that is driven by the engine 12.

In addition, when the remaining charge level SOC of the battery 54 becomes larger than the second determination value SOC2 set to be larger than the first determination value SOC1 while the operating point of the engine 12 is within the engine torque stable region TS, the engine rotational speed increase control unit 94 terminates the temporary increase of the target lower limit rotational speed and returns from the target lower limit rotational speed Ntl1 to the target lower limit rotational speed Ntl.

The charge control unit 96 of the power generation control unit 98 at the time of insufficient charging controls the torque of the engine 12 while the operating point of the engine 12 is set within the engine torque stable region TS by the engine rotational speed increase control unit 94 so that the actual charge level (per unit time) of the battery 54 by the electric motor MG becomes a preset target charge level (per unit time), that is, the throttle opening degree θ of the engine 12 is set so as to obtain the charging current by the electric motor MG for setting the actual charge level of the battery 54 to the preset target charge level, and the operating point of the engine 12 maintains the rotational speed of the engine 12 set within the engine torque stable region TS. The charge level (KW) is calculated from the charge current and the charge voltage of the battery 54.

Further, the charge control unit 96 executes the rotational speed feedback control so that the actual rotational speed Ne of the engine 12 in which the operating point of the engine 12 is within the engine torque stable region TS becomes the target lower limit rotational speed Ntls set in advance in the stopped state of the vehicle 10. As a result, the rotational speed Ne of the engine 12 is stably maintained, so that the battery 54 can be easily recovered from a condition in which the charge level is insufficient.

Figure 3:
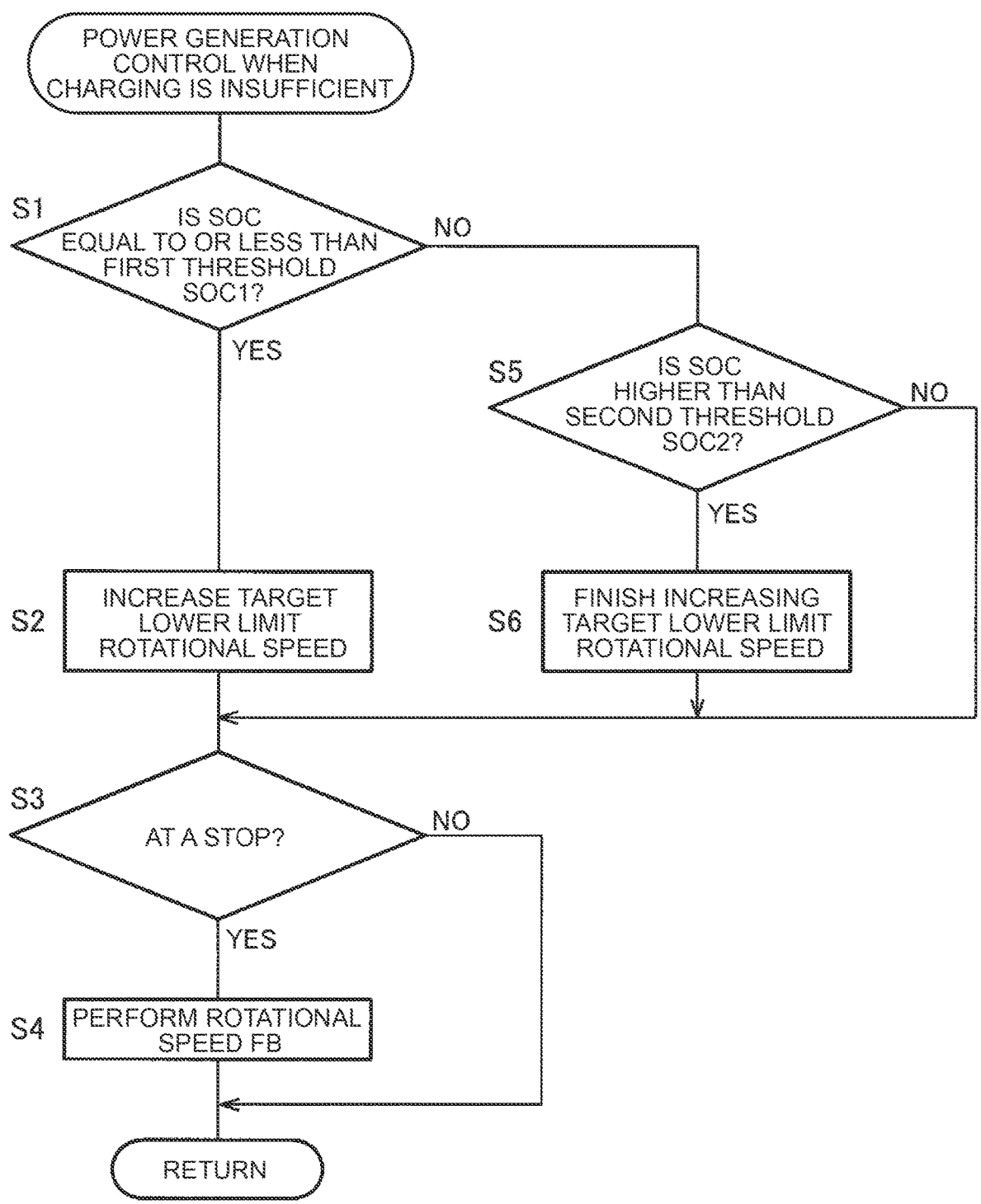
FIG. 3 is a flowchart illustrating a main part of a control function of the electronic control unit of FIG. 1.
Figure 4:
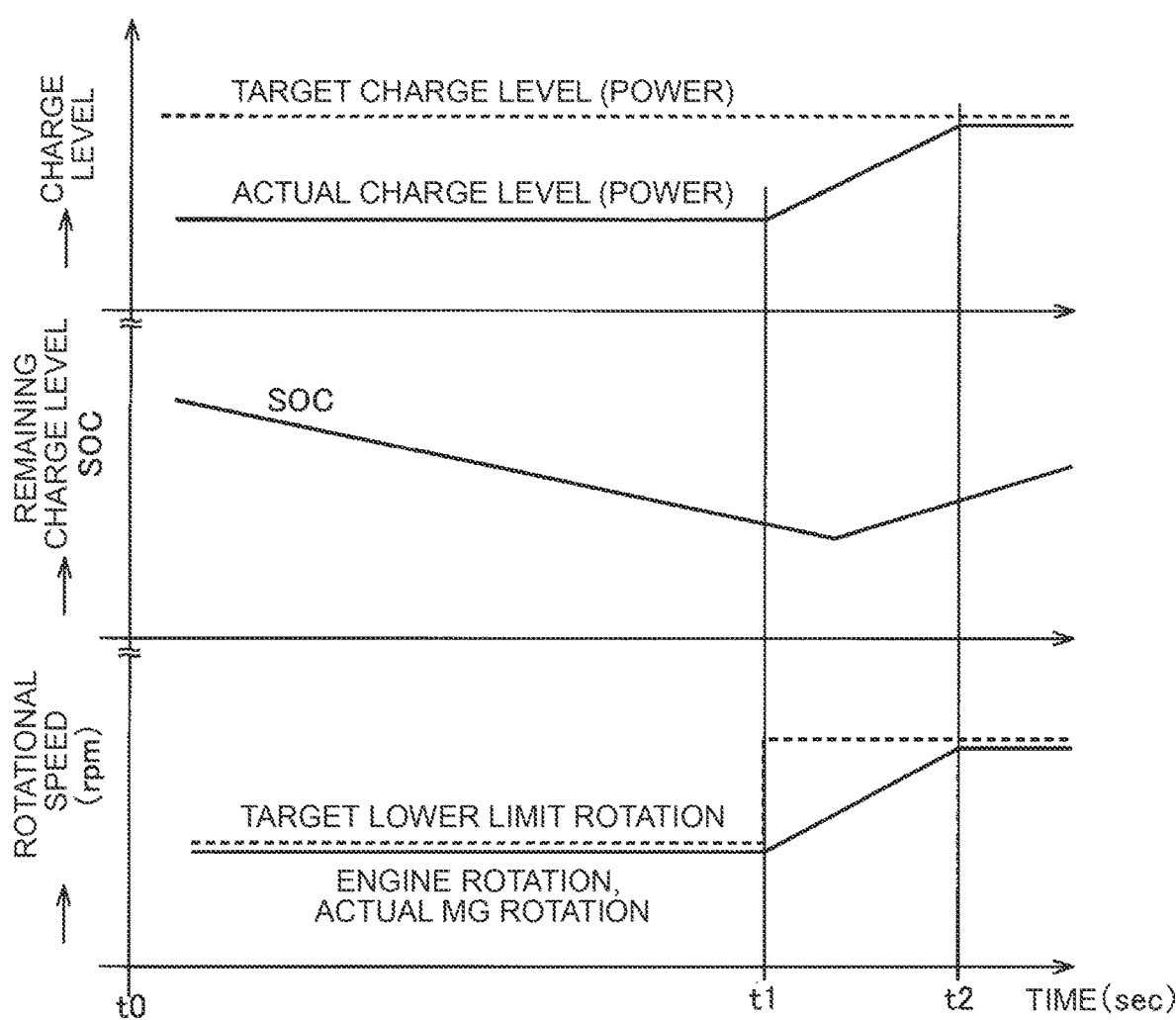
FIG. 4 is a time chart illustrating a main part of a control operation of the electronic control device of FIG. 1.

FIG. 3 is a flowchart for describing a main part of a control operation of the power generation control at the time of insufficient charge of the electronic control device 90, and FIG. 4 is a time chart for describing a main part of a control operation of the power generation control at the time of insufficient charge of the electronic control device 90. In the step S1 of FIG. 3 (hereinafter, steps are omitted), S2, S5, S6 corresponds to the control function of the engine rotational speed increase control unit 94, and S3, S4 corresponds to the control function of the charge control unit 96.

In S1 of FIG. 3, it is determined whether or not the remaining charge level SOC of the battery 54 has decreased to a predetermined first determination value SOC1 or less. If the determination of S1 is negative and the determination of S5 is also negative, the process of FIG. 3 is repeated. The section from to time point to t1 time point in FIG. 4 indicates this condition. In this section, the remaining charge level SOC of the battery 54 continuously decreases.

When the determination of S1 is affirmative, in S2, the target lower limit rotational speed of the target value of the rotational speed control of the engine 12 or the electric motor MG driven by the engine 12 is set to the target lower limit rotational speed Ntl1 which is temporarily increased by a predetermined value from the target lower limit rotational speed Nt used so far. t1 point in FIG. 4 indicates this condition.

Next, in S3, it is determined whether or not the vehicles 10 are stopped. If the determination of S3 is negative, S4 is skipped, but if the determination of S3 is affirmative, a rotational speed feedback control is performed in S4 to cause the rotational speed of the electric motor MG driven by the engine 12 or the engine 12 to follow the target lower limit rotational speed Ntl1. Since the vehicle 10 is stopped, the idle rotational speed control of the engine 12 having the target lower limit rotational speed Ntl1 as the target speed is substantially executed. After t1 point in FIG. 4, this condition is indicated, and at t2 point in time, the actual rotational speed of the engine 12 and the electric motor MG is made to coincide with the target lower limit rotational speed Ntl1. From t1 time point to t2 time point, the actual rotational speed of the engine 12 and the electric motor MG is a section that increases toward the target lower limit rotational speed Ntl1, and in this section, the actual charge level of the battery 54 is increased toward the target charge level.

If the determination of S1 is negative while the above steps are repeatedly executed, it is determined in S5 whether or not the remaining charge level SOC of the battery 54 is larger than a preset second determination SOC2. In this case, if the determination of S1 is negative, S6 is skipped, but if the determination of S5 is affirmative, a temporary increase in the target lower limit rotational speed is terminated in S6. That is, the target lower limit rotational speed is lowered from the target lower limit rotational speed Ntl1 to the target lower limit rotational speed Nt.

As described above, according to the electronic control device 90 of the present embodiment, when the remaining charge level SOC of the battery 54 is reduced to a predetermined first determination value SOC1 or less, the engine rotational speed increase control unit 94 increases the target lower limit rotational speed Ntl of the engine 12 or the electric motor MG to the target lower limit rotational speed Ntl1 so that the operating point of the engine 12 falls within a predetermined engine torque stable region TS. Then, while the operating point of the engine 12 is set within the engine torque stable region TS, the charge control unit 96 controls the negative torque of the electric motor MG so that the actual charge level by the electric motor MG becomes a preset target charge level. This makes it possible to recover the battery 54 from an insufficient charge level.

Further, according to the electronic control device 90 of the present embodiment, the engine torque stable region TS is a region in which, in the two-dimensional coordinate plane for the rotational speed of the engine 12 and the torque of the engine 12, the high intake air temperature of the engine 12, knocking of the engine 12, a misfire of the engine 12, the torque accuracy of the engine 12 is not sufficiently obtained due to such resonances of the pulsation absorbing damper 21 of the power transmission system, and the torque of the engine 12 becomes unstable except the engine torque unstable region TU. As described above, the engine torque unstable region TU in which the torque of the engine 12 is unstable is eliminated, and the torque of the electric motor MG is controlled so that the actual charge level by the electric motor MG becomes a preset target charge level in the engine torque stable region TS in which the torque control accuracy of the engine 12 is easily generated, so that the battery 54 can be easily recovered from an insufficient charge level.

Further, according to the electronic control device 90 of the present embodiment, the charge control unit 96 performs the rotational speed feedback control so that the actual rotational speed of the electric motor MG becomes a target value based on a predetermined target lower limit rotational speed in the stopped condition of the vehicle 10. As a result, the rotational speeds of the engine 12 and the electric motor MG are stably maintained, so that the battery 54 can be easily recovered from an insufficient charge level.

Further, according to the electronic control device 90 of the present embodiment, the value on the boundary (line L) between the engine torque unstable region TU in which the torque of the engine 12 is unstable and the engine torque stable region TS in which the torque of the engine 12 is stable is a value along the boundary (line L) or a value along the boundary thereof, in which the torque accuracy of the engine is not sufficiently obtained in the two-dimensional coordinate plane for the rotational speed of the engine 12 and the torque of the engine 12. Accordingly, since the rotational speed of the electric motor MG is controlled so that the actual charge level of the battery 54 becomes a preset target charge level in a region where the torque of the engine 12 is unstable is eliminated and the torque control accuracy of the engine 12 is easily obtained, the battery 54 can be easily recovered from an insufficient charge level.

Although the examples of the present disclosure have been described in detail with reference to the drawings, the present disclosure also applies to other modes.

For example, in the above-described embodiment, the torque converter 22 is provided in the power transmission path 15 of the vehicle 10, but the starting clutch may be provided instead of the torque converter 22.

Further, in the above-described embodiment, as shown in t1 time point of FIG. 4, the target lower limit rotational speed is increased stepwise, but it may be increased smoothly.

It should be noted that the embodiment described above is merely one embodiment, and the present disclosure can be implemented in a mode in which various changes and improvements are made based on the knowledge of those skilled in the art.

What is claimed is:

1. A control device for a hybrid electric vehicle, the hybrid electric vehicle including an engine, an electric motor connected to a power transmission path between the engine and a drive wheel so as to be able to transmit power, and a battery configured to be charged with electric power generated by the electric motor driven by the engine, the control device comprising:
    an engine rotational speed increase control unit configured to, when a remaining charge level of the battery has decreased to a predetermined value or less, increase a rotational speed of the engine in such a way that an operating point of the engine falls within a preset engine torque stable region; and
    a charge control unit configured to, with the operating point of the engine being controlled to be within the engine torque stable region by the engine rotational speed increase control unit, control torque of the electric motor in such a way that an actual charge level with the electric motor becomes a preset target charge level.

2. The control device according to claim 1, wherein the engine torque stable region is a region of a two-dimensional coordinate plane for the rotational speed of the engine and torque of the engine excluding a region where the torque of the engine is unstable because sufficient torque accuracy of the engine is not achieved due to a high intake air temperature of the engine, knocking of the engine, a misfire of the engine, resonance of a power transmission member, or the like.

3. The control device according to claim 1, wherein the charge control unit is configured to, when the hybrid electric vehicle is at a stop, perform rotational speed feedback control on the electric motor in such a manner that an actual rotational speed becomes a target value that is based on a preset target lower limit rotational speed.

4. The control device according to claim 3, wherein the target lower limit rotational speed is either a value on a boundary of the region where the torque of the engine is unstable because sufficient torque accuracy of the engine is not achieved in a two-dimensional coordinate plane for the rotational speed of the engine and the torque of the engine or a value along the boundary.

* * * * *